(12) United States Patent
Uemura et al.

(10) Patent No.: US 7,125,151 B2
(45) Date of Patent: Oct. 24, 2006

(54) LINE-ILLUMINATING DEVICE AND IMAGE SENSOR

(75) Inventors: Yoshiyuki Uemura, Osaka (JP); Takashi Kishimoto, Osaka (JP); Kozo Fujimura, Osaka (JP); Tomihisa Saito, Osaka (JP); Masafumi Taguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 362 days.

(21) Appl. No.: 10/611,084

(22) Filed: Jul. 1, 2003

(65) Prior Publication Data
US 2005/0195618 A1     Sep. 8, 2005

(30) Foreign Application Priority Data
Jul. 19, 2002    (JP) .............................. 2002-210608

(51) Int. Cl.
*F21V 8/00* (2006.01)
(52) U.S. Cl. ...................... 362/602; 362/600; 362/555; 362/558; 362/625
(58) Field of Classification Search ................ 362/558, 362/600, 555, 602, 625, 632; 355/67–70
See application file for complete search history.

(56) References Cited

U.S. PATENT DOCUMENTS

| 6,357,903 B1* | 3/2002 | Furusawa et al. ........... 362/555 |
| 6,612,730 B1* | 9/2003 | Ikeda .......................... 362/558 |
| 6,755,546 B1* | 6/2004 | Ohkawa ...................... 362/626 |
| 6,783,254 B1* | 8/2004 | Fujino et al. ................ 362/615 |
| 2002/0114152 A1* | 8/2002 | Fujino et al. .................. 362/31 |

FOREIGN PATENT DOCUMENTS

JP         3083092        6/2002

* cited by examiner

*Primary Examiner*—Sandra O'Shea
*Assistant Examiner*—Anabel Ton
(74) *Attorney, Agent, or Firm*—Merchant & Gould P.C.

(57) ABSTRACT

A light guide 11 of a rectangular cross-section has side faces 11a, 11b including short sides in the longitudinal direction of which one side face 11a is provided with a light-scattering pattern 20, formed by screen-printing in white paint, for scattering the light incident to the light guide 11. The other side face 11b facing the side face 11a is exposed from a casing 12 to serve as a light-emitting surface. In the present embodiment, it is possible to secure a sufficient amount of light because the whole area of the side face is used as the light-emitting surface. The remaining side faces 11c, 11d of the light guide 11 are side faces including the long sides. Since the side faces 11c, 11d easily produce a surface sink during molding, neither the light-scattering pattern 20 nor the light-emitting surface is provided thereon.

8 Claims, 4 Drawing Sheets

(a)

(b)

(a)

(b)

(c)

(d)

LINE-ILLUMINATING DEVICE AND IMAGE SENSOR

BACKGROUND OF THE INVENTION

1. Field of the Invention

The present invention relates to an illuminating device using a bar-shaped light guide and a contact-type image sensor incorporated with the illuminating device.

2. Description of the Prior Art

A contact-type image sensor is used as a device for reading a document in a facsimile machine, a copying machine, an image scanner device and the like. The contact-type image sensor is provided with a line-illuminating device for linearly illuminating a document surface along the main scanning zone.

A line-illuminating device using a light guide is known. For example, Japanese Patent No. 3083092 discloses a line-illuminating device in which a light-emitting unit is provided on one end of the light guide and a light-scattering pattern is formed along the longitudinal direction of the light guide to spread and reflect the light emitted from the light-emitting unit. A plurality of light sources (i.e., LEDs) of the light-emitting unit is provided on a normal line of the light-scattering pattern, wherein a light-emitting surface of the light guide is formed in a different direction from the normal line.

In the prior art including the above-mentioned line-illuminating device, the light guide is made rectangular in its cross-section. In the case where the light-scattering pattern is formed on the light guide by printing, it is formed on the side face including long sides in the longitudinal direction for easy printing. In the embodiment of Japanese Patent No. 3083092, the side face including long sides in the longitudinal direction is provided with a slanting notch on which the light-scattering pattern is printed.

The light guide is obtained by injection-molding a resin such as acrylic. When the light guide of a rectangular cross-section is obtained by injection molding, a surface sink is mainly produced during molding on the side face including the long sides.

As described above, in the light guide having the rectangular cross-section, the light-scattering pattern has been printed on the side face including the long sides in the longitudinal direction, in other words, on the side where the surface sink is produced in the prior art. In this manner, a pattern shape is different from the intended shape and as a result, the intensity of illuminating light in a main scanning direction may be uneven.

In the case where the notch is provided to print the light-scattering pattern as described in the embodiment of Japanese Patent No. 3083092, it is troublesome because printing itself is effected on a surface which is not parallel with the side face of the light guide. Further, uneven intensity of illuminating light is readily obtained because a surface sink is easily produced on that surface.

In the conventional line-illuminating device, the light-emitting surface is comparatively small in area and the direction of illuminating light emitted from the light guide is precisely described. As a result, attenuation of light intensity in the light emitting direction becomes large and light distribution characteristics (i.e., the ratio of optical power in a predetermined position to optical power in a position out of the predetermined position) become worse. For example, fluctuation of output power in the case where a document is slightly elevated in the contact-type image sensor becomes large. In this manner, severe positioning accuracy is required when the line-illuminating device is incorporated with the contact-type image sensor.

SUMMARY OF THE INVENTION

It is therefore an object of the present invention to provide an improved line-illuminating device of which the intensity of light in a main scanning direction is uniform and in which severe accuracy is not required when being incorporated in a contact-type image sensor.

To solve the above-mentioned problems, a line-illuminating device according to the first invention is provided, in which a light-emitting unit is provided on one end of a bar-shaped light guide, characterized in that the light guide is rectangular in cross-section, wherein one of the side faces of the light guide facing in the longitudinal direction including short sides is provided with a light-scattering pattern and the other is used as a light-emitting surface, and that the light-scattering pattern has an area per unit length increasing as the distance from the light-emitting unit increases, wherein a light source of the light-emitting unit is provided on a normal line of the light-scattering pattern.

The line-illuminating device according to the second invention is provided, in which a light-emitting unit is provided on one end of a bar-shaped light guide, characterized in that the long side of a cross-sectional shape of the bar-shaped light guide forms part of a parabola or an oval, wherein one of the side faces of the light guide facing in the longitudinal direction including the short sides is provided with a light-scattering pattern and the other is used as a light-emitting surface, and that the light-scattering pattern has an area per unit length increasing as the distance from the light-emitting unit increases, wherein a light source of the light-emitting unit is provided on a normal line of the light-scattering pattern.

In this manner, since the light-scattering pattern is formed, on the side face including the short sides where a surface sink is not easily produced, by printing or other methods, it is possible to make the intensity of illuminating light in the main scanning direction uniform.

The whole area of the side face facing the face on which the light scattering pattern is provided can be used as the light-emitting surface. Accordingly, it is possible to make the area of the light-emitting surface larger than before, to control the attenuation of light intensity, and to improve the light distribution characteristics. Further, severe positioning accuracy is not required when the line-illuminating device is incorporated.

By providing the light source on the normal line of the light-scattering pattern, it is possible to make the light scattering efficiency maximum. As a result, it is possible to make the light emitting from the opposite side face maximum.

The shape of the bar-shaped light guide is not completely rectangular in cross-section, but can be chamfered in a C or R surface along the longitudinal direction of an edge of the side face where the light-scattering pattern is printed. In this case, the light-scattering pattern is not printed on the C or R surface.

It is also desirable that the bar-shaped light guide be housed in a white casing so that the light-emitting surface is exposed. By using such a white casing, even in a case where light from the light source is not totally reflected at the internal surface of the light guide, light from the light source can be reflected or scattered at the internal surface of the white casing, and thereby the reflected light or the scattered light is allowed to go back to the light guide and be emitted from the light-emitting surface.

The present invention also provides an image sensor having a frame which incorporates therein the above-mentioned line-illuminating device, a line image sensor, and a rod lens array for converging the reflected light or the transmitted light from a document on the line image sensor. In particular, it is desirable that the installation angle of the line-illuminating device be a slanted between 0 and 45 degrees relative to a horizontal plane.

BRIEF DESCRIPTION OF THE DRAWINGS

The above and other objects, features and advantages of the present invention will become more apparent from the following description when taken in conjunction with the accompanying drawings.

FIG. 5(*a*) is a graph of an image sensor incorporating a conventional line-illuminating device therein and FIG. 5(*b*) is a graph of an image sensor incorporating a line-illuminating device therein according to the present invention.

DETAILED DESCRIPTION OF THE PREFERRED EMBODIMENTS

Figure 1:
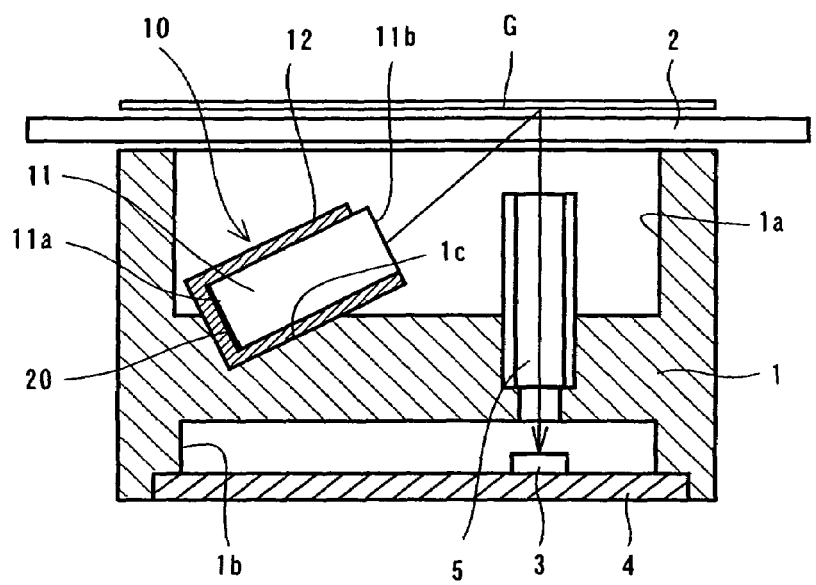
FIG. 1 is a cross-sectional view of an image sensor incorporated with a line-illuminating device according to the present invention.
Figure 2:
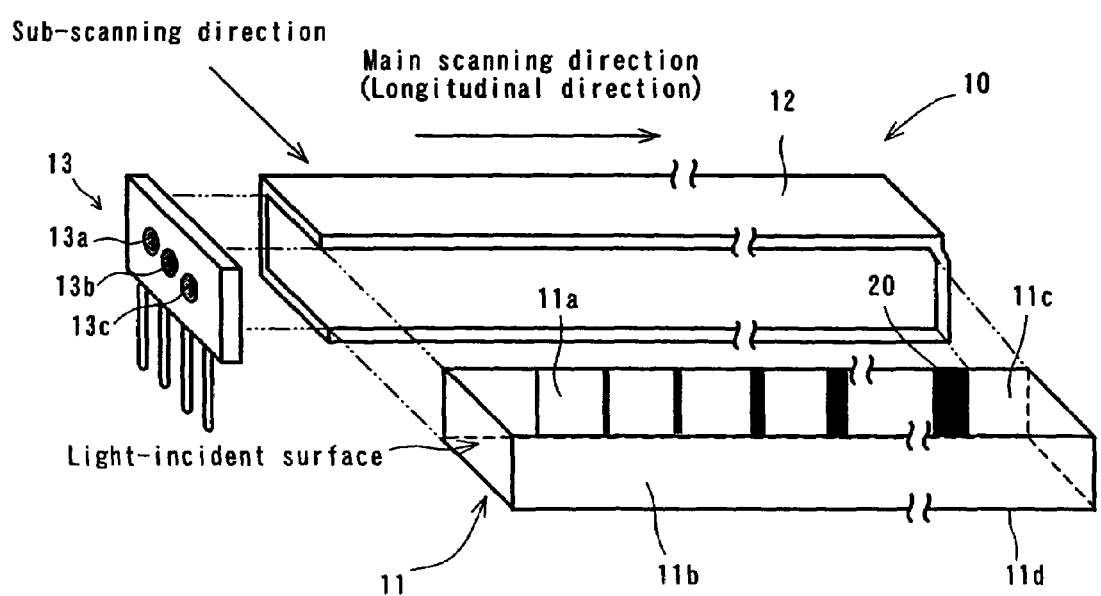
FIG. 2 is an exploded perspective view of the line-illuminating device.
Figure 3:
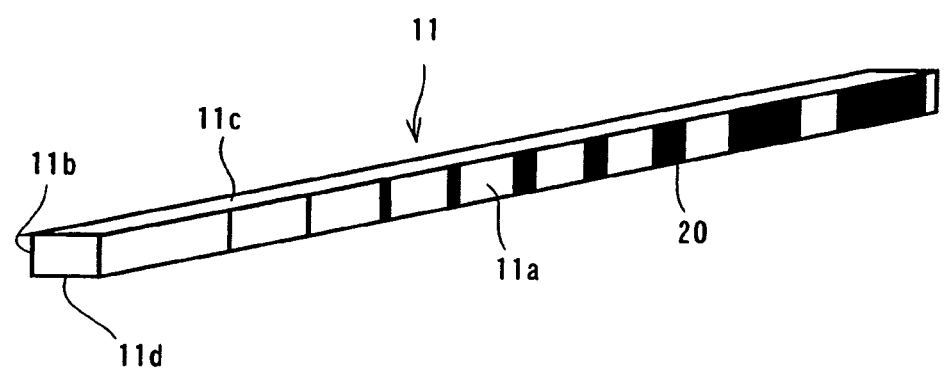
FIG. 3 is a perspective view showing one example of a light-scattering pattern formed on the back side of a light guide.
Figure 4:
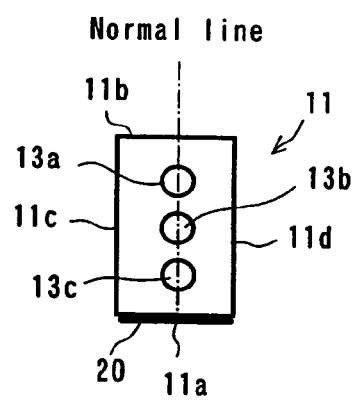
FIG. 4 is an end view showing the relationship between the light-scattering pattern and a light-emitting unit.

Preferred embodiments of the present invention will now be described with reference to the accompanying drawings. FIG. 1 is a cross-sectional view of an image sensor incorporated with a line-illuminating device according to the present invention. FIG. 2 is an exploded perspective view of the line-illuminating device. FIG. 3 is a perspective view showing one example of a light-scattering pattern formed on the back side of a light guide and FIG. 4 is an end view showing the relationship between the light-scattering pattern and a light-emitting unit.

The image sensor is provided, in which a frame 1 is provided with depressed portions 1*a*, 1*b* and the upper surface of the depressed portion 1*a* is covered by a glass plate 2 for mounting a document G thereon. The depressed portion 1*a* is further provided therein with a depressed portion 1*c* for fixedly securing a line-illuminating device 10 therein at an angle (between 0 and 45 degrees relative to the horizontal plane). Provided in the lower depressed portion 1*b* is a sensor base plate 4 on which a photoelectric transfer element (i.e., a line image sensor) 3 is mounted. A rod lens array 5 for 1:1 imaging is also held in the frame 1.

The angle of inclination of the line-illuminating device 10 is set between 0 and 45 degrees on the grounds that if it is set at 0 degree, the illuminating light is totally reflected by the glass plate 2, while if it is set at more than 45 degrees, height dimension of the image sensor becomes large and the light distribution characteristics become worse.

The illuminating light from the line-illuminating device 10 is irradiated on a document G via the glass plate 2. The light reflected from the document G is detected by a photoelectric transfer element (i.e., a line image sensor) 3 via a rod lens array 5, thereby reading the document G. The frame 1 is moved in the sub-scanning direction of FIG. 2 relative to the glass plate 2 to read a desired area of the document G.

As shown in FIG. 2, the line-illuminating device 10 has a white light guide casing 12 housing a light guide 11 and is provided on its one end with a light-emitting unit 13. The light guide 11 is obtained by injection-molding a transparent resin such as acrylic and its cross-sectional shape is rectangular. The light guide 11 has side faces 11*a*, 11*b* in the longitudinal direction including the short sides. Formed on one side face 11*a* of the side faces 11*a*, 11*b* by screen-printing white paint is a light-scattering pattern 20 for scattering the light incident to the light guide 11.

The light-scattering pattern 20 is formed to increase its area per unit length as the distance from the light-emitting unit increases. In the figure, a scattering portion of a different width is discontinuously formed for the whole width of the side face 11*a*. However, the pattern shape is discretionary and it is not necessary to form the pattern for the whole width of the side face 11*a* in the short direction. The light-scattering pattern can also be continuously formed so that it broadens in the short direction as the distance from the light-emitting unit 13 increases. The point is that the light emitted from the light-emitting surface can be kept uniform for the whole length in the main scanning direction by broadening an area for forming the light-scattering pattern as the distance from the light-incident surface increases.

Further, the side face 11*b* facing the side face 11*a* is exposed from the casing 12 to serve as the light-emitting surface. In this embodiment, since the whole area of the side face is used as the light-emitting surface, it is possible to secure sufficient amount of light.

The remaining side faces 11*c*, 11*d* of the light guide 11 include the long sides. Since these side faces readily cause a surface sink during molding, neither the light-scattering pattern 20 nor the light-emitting surface is provided thereon.

In the case where the intensity of illuminating light deteriorates as the distance from the light-emitting unit 13 increases, the light-scattering pattern can be provided on at least one of the side faces 11*c*, 11*d* facing in the longitudinal direction including the long sides except in the vicinity of the light-emitting unit. In this case, the surface sink is readily produced on the side face including the long sides, but since the light-scattering pattern provided on this side face is larger than that of the side face 11*a*, the light-scattering pattern is not so affected by the surface sink. It is desirable that the light-scattering pattern be provided to cause the area per unit length to increase as the distance from the light-emitting unit increases. With this construction, it is possible to prevent the intensity of illuminating light from deteriorating by the light-scattering pattern formed on the side face including the long sides even though the light-scattering pattern is far from the light-emitting unit.

The light-emitting unit 13 comprises three light-emitting elements (i.e., LEDs) 13*a*, 13*b*, and 13*c* in the figure. Specifically, the light-emitting element 13*a* is red (R), the light-emitting element 13*b* is Green (G), and the light-emitting element 13*c* is blue (B).

As shown in FIG. 4, these three light-emitting elements (LEDs) 13*a*, 13*b* and 13*c* are provided in line on the normal line of the light-scattering pattern 20 as seen from the end face. The number of light-emitting elements can be one.

Figure 5:
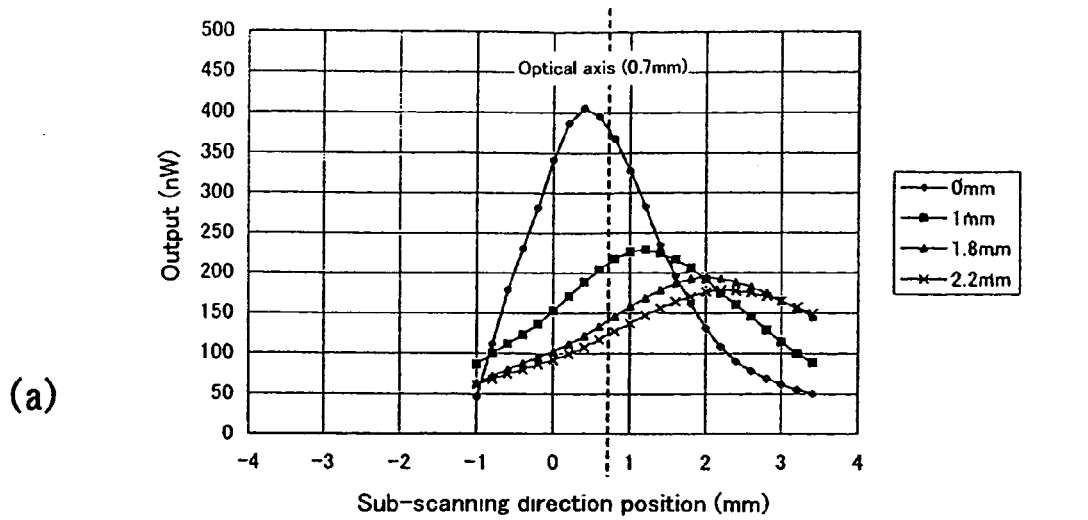
FIG. 5 is a graph showing the relationship between a position in a sub-scanning direction and output for each elevation amount of a document.
Figure 5:
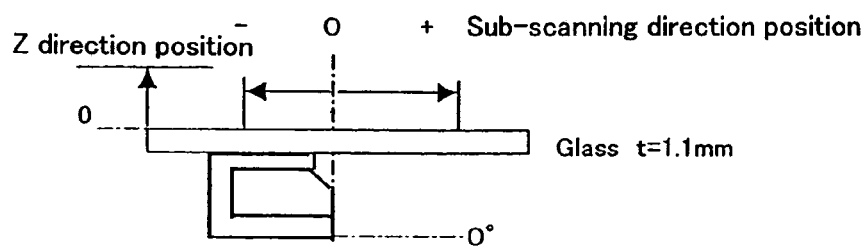
Figure 5:
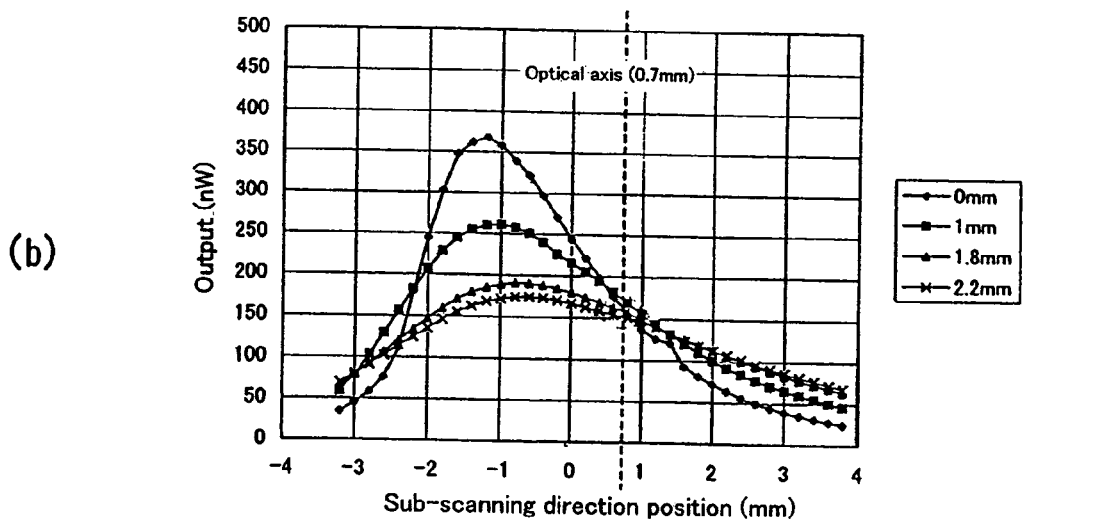
Figure 5:
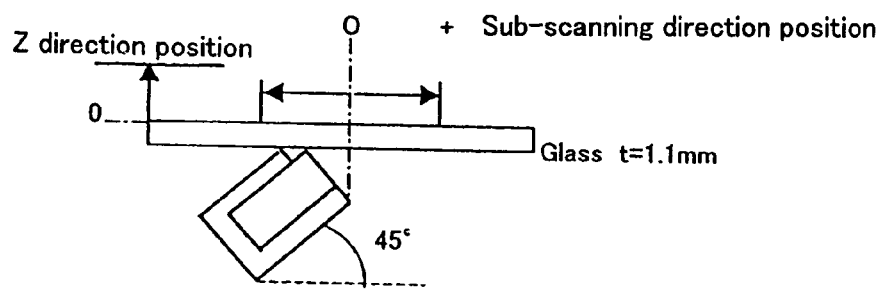

FIG. 5 is a graph showing the relationship between a sub-scanning direction position and the output for each elevation amount of the document. FIG. 5(a) is a graph of the image sensor incorporating a conventional line-illuminated device therein and FIG. 5(b) is a graph of the image sensor incorporating the line-illuminating device according to the present invention. In FIG. 5, a measuring position in the main scanning direction is set 100 mm away from the light-emitting unit 13.

As is obvious from these figures, in the case where the conventional line-illuminating device is used, the intensity of illuminating light remarkably varies with the elevation of the document at most points of a sub-scanning direction position. Accordingly, the position to set the optical axis of the rod lens array 5 is limited to a specific position where the intensity of illuminating light hardly varies with the elevation of the document. On the other hand, when the line-illuminating device according to the present invention is used, the intensity of illuminating light rarely varies with the elevation of the document on the plus side of the sub-scanning direction position. This means that the area for placing the optical axis of the rod lens array 5 is broad. In another words, stable reading can be effected relative to the elevation of the document by placing the optical axis of the rod lens array on the plus side of the sub-scanning direction position.

Figure 6:
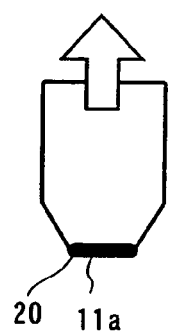
FIG. 6(*a*) through (*d*) are views showing another embodiment of the light guide.
Figure 6:
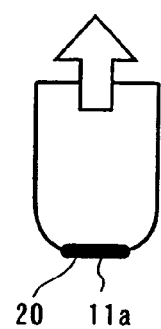
Figure 6:
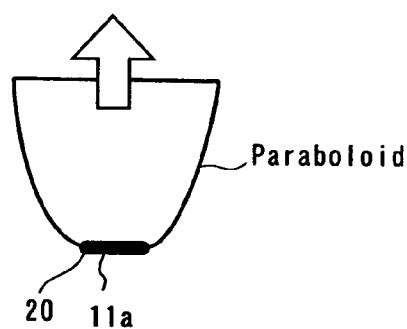
Figure 6:
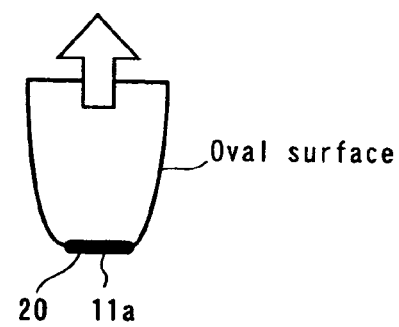

FIGS. 6(a), (b), (c) and (d) are cross-sectional views showing another embodiment of the light guide 11. These are cross-sectional views in the direction perpendicular to the longitudinal direction.

The light guide 11 shown in FIG. 6(a) forms a C-surface on the edge of the side face 11a in the longitudinal direction and the light guide 11 shown in FIG. 6(b) forms an R-surface on the edge of the side face 11a in the longitudinal direction. By chamfering the edge in this manner, the light scattered from the light-scattering pattern 20 is reflected at the chamfered surface, and the reflected light is guided to the light-emitting surface 11b.

In the light guide 11 shown in FIG. 6(c), the edge of a paraboloid is cut at a position of a focal point and the light-scattering pattern 20 is formed on the cut surface. By using such a paraboloid, the light scattered from the light-scattering pattern 20 is reflected at the paraboloid and the reflected light is then guided to the light-emitting surface 11b. Now, the light scattered at the light-scattering pattern 20 at a position that is a focal point of the paraboloid is reflected at the paraboloid and is emitted in the direction parallel with the direction of the normal line of the light-scattering pattern 20, thereby improving the light distribution characteristics. The light scattered at the light-scattering pattern 20 at a position a little away from the focal point of the paraboloid is also emitted in the direction almost parallel with the direction of the normal line of the light-scattering pattern 20 when being reflected at the paraboloid. Accordingly, it is possible to obtain the illuminating light including good distribution characteristics of light even though the light-scattering pattern 20 is provided on the whole area of the cut surface.

In the light guide 11 shown in FIG. 6(d), the edge of the half oval surface is cut at the position of the focal point and the light-scattering pattern 20 is formed on the cut surface. By using such an oval surface, the light scattered from the light-scattering pattern 20 is reflected at the oval surface and the reflected light is then guided to the light-emitting surface 11b. Now, the light scattered at the light-scattering pattern 20 at a position that is the focal point of the oval surface is reflected at the oval surface and is emitted in the other focal point direction of the oval. Thus, the light distribution characteristics of the illuminating light are improved. The light scattered at the light-scattering pattern 20 at a position a little distant from the focal point of the oval surface is also emitted in the direction close to the other focal point direction of the oval when being reflected at the oval surface. Accordingly, it is possible to obtain the illuminating light including good distribution characteristics of light even though the light-scattering pattern 20 is provided on the whole area of the cut surface.

As described above, according to the present invention, a light-scattering pattern is printed on the side face including the short sides of the light guide of a rectangular cross-section forming a line-illuminating device. In this manner, it is possible to form a correct pattern without being affected by a surface sink and to make the intensity of light in the main scanning direction uniform.

Further, according to the present invention, the emitting direction of light is not limited to a narrow area and the whole area of the side face facing the surface on which the light-scattering pattern is printed is used as a light-emitting surface. Accordingly, the attenuation of light intensity becomes small and as a result, the light distribution characteristics improve. When the line-illuminating device is incorporated in the contact-type image sensor, severe accuracy is not required and as a result, production becomes easier.

What is claimed is:

1. A line-illuminating device having a light-emitting unit provided on one end of a bar-shaped light guide, characterized in that the cross section of the light guide is rectangular having a pair of long sides and a pair of short sides, wherein one of the side faces of the light guide including the short side of the rectangular cross section and facing each other in the longitudinal direction is provided with a light-scattering pattern and the other is used as a light-emitting surface, and that the light-scattering pattern has an area per unit length increasing as the distance from the light-emitting unit increases, wherein the side face on which the light-scattering pattern is provided is chamfered along the longitudinal direction.

2. A line-illuminating device having a light-emitting unit provided on one end of a bar-shaped light guide, characterized in that the long side of the cross-sectional shape of the bar-shaped light guide forms part of a parabola or an oval, wherein one of the side faces of the light guide facing in the longitudinal direction including the short sides is provided with a light-scattering pattern and the other is used as a light-emitting surface, and that the light-scattering pattern has an area per unit length increasing as the distance from the light-emitting unit increases, wherein a light source of the light-emitting unit is provided on a normal line of the light-scattering pattern.

3. The line-illuminating device according to claim 1, wherein the light guide is housed in a white casing so that the light-emitting surface is exposed.

4. An image sensor having a frame which incorporates the line-illuminating device according to claim 1, a line image sensor, and a rod lens array for converging reflected light or transmitted light from a document on the line image sensor therein.

5. The image sensor according to claim 4, wherein the line-illuminating device is incorporated in the frame in a slanted condition between 0 and 45 degrees relative to the horizontal plane.

6. The line-illuminating device according to claim 2, wherein the side face on which the light-scattering pattern is provided is chamfered along the longitudinal direction.

7. The line-illuminating device according to claim 2, wherein the light guide is housed in a white casing so that the light-emitting surface is exposed.

8. An image sensor having a frame which incorporates the line-illuminating device according to claim 2, a line image sensor, and a rod lens array for converging reflected light or transmitted light from a document on the line image sensor therein.

* * * * *